US008957546B2

(12) United States Patent
Brennan et al.

(10) Patent No.: US 8,957,546 B2
(45) Date of Patent: Feb. 17, 2015

(54) ELECTRICAL COGENERATION SYSTEM AND METHOD

(75) Inventors: Mark W. Brennan, Preston, GA (US); Kenneth E. Cockerham, Franklin, TN (US)

(73) Assignee: Nixon Power Services, LLC, Brentwood, TN (US)

( * ) Notice: Subject to any disclaimer, the term of this patent is extended or adjusted under 35 U.S.C. 154(b) by 0 days.

(21) Appl. No.: 13/545,355

(22) Filed: Jul. 10, 2012

(65) Prior Publication Data
US 2014/0015324 A1   Jan. 16, 2014

(51) Int. Cl.
*H02J 3/04* (2006.01)

(52) U.S. Cl.
USPC .................................. 307/59; 307/64; 307/82

(58) Field of Classification Search
USPC .................................. 307/68, 59, 82, 64–66
See application file for complete search history.

(56) References Cited

U.S. PATENT DOCUMENTS

| 4,423,336 | A  | 12/1983 | Iverson et al. |
| 6,037,758 | A  | 3/2000  | Perez ............................ 323/268 |
| 6,678,176 | B2 | 1/2004  | Lumsden ........................ 363/95 |
| 7,492,057 | B2 | 2/2009  | Baldwin et al. ................. 307/64 |
| 7,696,642 | B2 | 4/2010  | Wakitani et al. ............... 307/65 |
| 7,893,346 | B2 | 2/2011  | Nachamkin et al. ........... 136/244 |
| 8,044,539 | B2 | 10/2011 | Pan ................................ 307/86 |
| 8,138,630 | B2 | 3/2012  | Dibachi et al. |
| 8,148,844 | B2 | 4/2012  | Pan ................................ 307/29 |
| 2004/0084965 | A1 | 5/2004 | Welches et al. |
| 2008/0091625 | A1 | 4/2008 | Kremen |
| 2008/0278003 | A1 | 11/2008 | Pouchet et al. |
| 2009/0027932 | A1 | 1/2009 | Haines et al. |
| 2009/0140576 | A1 | 6/2009 | Yu et al. |
| 2009/0152951 | A1 | 6/2009 | Algrain |
| 2009/0261599 | A1 | 10/2009 | Alston et al. |
| 2009/0315336 | A1 | 12/2009 | Harr |
| 2010/0127572 | A1 | 5/2010 | Uselton et al. |
| 2010/0270864 | A1 | 10/2010 | Vyas et al. |
| 2011/0043160 | A1 | 2/2011 | Serban |
| 2011/0133552 | A1 | 6/2011 | Binder et al. |
| 2011/0163603 | A1 | 7/2011 | Chou et al. |
| 2011/0210613 | A1 | 9/2011 | O'Brien et al. |
| 2011/0278928 | A1 | 11/2011 | Burger et al. |

(Continued)

FOREIGN PATENT DOCUMENTS

| DE | 4232516 | 3/1993 |
| JP | 2000295785 | 10/2000 |

(Continued)

OTHER PUBLICATIONS

Machine translation for JP2004-104851A.*

(Continued)

*Primary Examiner* — Fritz M Fleming
(74) *Attorney, Agent, or Firm* — Blake P. Hurt

(57) ABSTRACT

An electrical cogeneration system and AC coupling method for efficiently distributing power from multiple AC sources. The system includes a main AC source, an AC generator, a solar panel, and an automatic transfer switch. The main AC source and the AC generator are connected to the transfer switch. The system also includes a DC/AC inverter, which is in communication with the solar panel. The transfer switch and the inverter are both connected to a common AC load panel where the power provided by the solar panel, the AC generator, and the main AC source is used to satisfy a common electrical load. The system further includes a system control device that is in communication with the inverter and the transfer switch and is capable of selectively determining power input to the AC load panel. An AC coupling method for distributing power from multiple AC sources is also provided.

20 Claims, 6 Drawing Sheets

(56) References Cited

U.S. PATENT DOCUMENTS

2012/0112544 A1 5/2012 Salcone
2012/0126623 A1 5/2012 Koehl

FOREIGN PATENT DOCUMENTS

| JP | 2004104851 A | * | 4/2004 |
| WO | WO 2008/153686 | | 12/2008 |
| WO | WO 2011/035326 | | 3/2011 |

OTHER PUBLICATIONS

Photovoltaic Design and Installation for Dummies, Ryan Mayfield, John Wiley and Sons, 2010.

Four (4) page article entitled: "Impact of Leading Power Factor Loads on Synchrous Alternators"; Copyright 2009 Cummins Power Generation.

* cited by examiner

ELECTRICAL COGENERATION SYSTEM AND METHOD

FIELD OF THE INVENTION

The invention herein pertains to electric cogeneration systems generally and particularly pertains to a system and method for efficiently managing and distributing power from multiple AC sources.

DESCRIPTION OF THE PRIOR ART AND OBJECTIVES OF THE INVENTION

Electric cogeneration systems have progressed from expensive industrial experiments to applications in commercial, residential, hospital, and environmental spheres. Early cogeneration systems relied on internal combustion engines, coal-fired generators, and hydroelectric turbines as mechanical power plants to supplement electrical power available from utility companies. Later, solar panels, wind turbines, and tidal generators were also incorporated into electric cogeneration systems. These environmentally friendly methods of producing electricity are also cheaper to operate because they focus on harvesting naturally occurring power sources instead of producing the energy with fossil fuels. However, the laws of nature prevent these environmentally friendly methods of electrical production from functioning at all times. Therefore, it becomes necessary to monitor an electric cogeneration system for fluxes and losses of electrical power when a system is under load.

Conventionally, it has also been necessary to include heavy, expensive, and toxic DC battery banks to store electrical energy for circumstances when sun generated electricity is unavailable or the AC utility electricity required by the common AC load is also unavailable or insufficient to meet a given need. A storm causing loss of AC utility electricity and solar generated electricity is a common example. Under these circumstances, current cogeneration system design and product availability mandates the use of large, multiple DC mass electrical storage devices (conventional lead/acid DC battery banks for example) to provide DC electrical energy to allow a solar DC/AC inverter to produce required AC voltage, frequency, and amperage (commonly called AC power) to meet the common AC load requirements. DC battery banks coupled to solar AC Inverter output is extremely inefficient, as up to 40% of the energy conversion lost to heat in the components and conductors.

Several existing DC systems exist for the collection and distribution of DC power. Many of these systems focus on direct current (DC) storage because the flow of electrons are in a constant direction, compared to alternating current (AC) which periodically reverses direction. Several DC to DC coupling systems exist for the collection and distribution of solar derived DC energy for example U.S. Pat. No. 7,696,642. This system collects all DC derived energy into a DC battery bank, DC load is supplied directly from DC battery bank(s), produces AC power provided by a DC/AC inverter that is always supplied by the DC battery bank. Therefore, it is desirable to create an electric cogeneration system that operates with AC, as opposed to DC voltage.

The use of an AC generator is always used as either an AC/DC battery charger or to supply the AC common load directly, bypassing the solar DC/AC inverter. AC coupling is not utilized in this design or any previously existing system, patented or otherwise. It is therefore of great social and economic importance to design a solar AC inverter to synchronous AC generator direct AC coupling system to eliminate the operational inefficiencies inherent to U.S. Pat. No. 7,696,642 and similar systems, and provide life essential and sustaining AC power under all circumstances regardless of the availability or usability of AC utility to the installation.

As referred to herein, the term "system control device" should be broadly construed. It can include any type of device capable of presenting electronic data to a user. For example, a system control device may be a computer configured to present AC current data to a user. Examples of such computer include, but are not limited to, conventional desktop computers as well as laptop computers. In another example, a system control device may be a mobile device such as, for example, but not limited to, a smart phone, a cell phone, a pager, a personal digital assistant (PDA), a mobile computer with a smart phone client, or the like. A system control device may also be a typical mobile device with a wireless data access-enabled device (e.g., an iPHONE® smart phone, a BLACKBERRY® smart phone, a NEXUS ONE™ smart phone, an iPAD® device, or the like) that is capable of sending and receiving data in a wireless manner using protocols like the Internet Protocol, or IP, and the wireless application protocol, WAP, or BLUETOOTH® in addition to serial communication protocols such as MODBUS. This allows users to access information via wireless devices, such as smart phones, mobile phones, pagers, two-way radios, communicators, and the like. Wireless data access is supported by many wireless networks, including, but not limited to, CDPD, CDMA, GSM, PDC, PHS, TDMA, FLEX, ReFLEX, iDEN, TETRA, DECT, DataTAC, Mobitex, EDGE and other 2G, 3G, 4G and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or micro-browsers, which are web browsers with small file sizes that can accommodate the reduced memory constraints of mobile wireless devices. In a representative embodiment, the mobile device is a cellular telephone or smart phone that operates over GPRS (General Packet Radio Services), which is a data technology for GSM networks. In addition to a conventional voice communication, a given mobile device can communicate with another such device via many different types of message transfer techniques, including SMS (short message service), enhanced SMS (EMS), multi-media message (MMS), email WAP, paging, or other known or later-developed wireless data formats.

AC electric cogeneration systems must also contain devices and methods to direct the flow of electricity within a system. Devices such as transfer switches are known in incorporate logic into their operation that directs a switch to shift from one power supply to another in the event that an electrical load is not being met or a malfunction occurs. These switches can be linked to a computer that can evaluate the current flowing through a switch and how much voltage is necessary to satisfy a given load demand. Systems are known in the art to switch from one power supply to another, but as illustrated in the U.S. Pat. No. 7,696,642, these systems are often inefficient, time consuming, or costly.

Thus, in view of the problems and disadvantages associated with prior art devices and methods, the present invention was conceived and one of its objectives is to provide an electric cogeneration system capable of meeting an electrical load with AC power provided simultaneously by a synchronous AC generator and a DC/AC solar inverter powered by a DC solar array.

It is another objective of the present invention to provide a system that can provide AC power back to a utility grid for credit.

It is still another objective of the present invention to provide a control system that can monitor and present data regarding an electric cogeneration system, either at a single point or multiple satellite locations.

It is another objective of the present invention to provide an AC cogeneration system that meets all current and anticipated electrical and fire safety codes and regulations.

It is yet another objective of the present invention to provide an electric cogeneration system that is based on the flow of alternating (AC) current.

It is a further objective of the present invention to provide a method for efficiently distributing AC power from multiple sources such as an AC solar inverter and a synchronous AC Generator.

It is still a further objective of the present invention to provide a method for isolating the utility provided AC power from the common AC load and the AC generator in compliance with UL 1741 and other safety codes during the period solar provided AC power and the AC synchronous generator are AC coupled by means of an automatic transfer switch (ATS).

It is yet a further objective of the present invention to provide an electric cogeneration system that is easy to install and inexpensive to operate while reducing the amount of energy needed from a utility company and the amount of fuel required by the synchronous AC generator while solar AC power is generated and consumed by the common AC load or directed back to the AC utility grid.

It is a further objective of the present invention to provide a system with control logic that can safely under all power and load scenarios balance the use of solar produced and generator electricity to meet a common load.

Various other objectives and advantages of the present invention will become apparent to those skilled in the art as a more detailed description is set forth below.

SUMMARY OF THE INVENTION

The aforesaid and other objectives are realized by providing a power distribution system from multiple AC power sources. The system includes a main AC source, a synchronous AC generator, a renewable power source such as radiant energy captured by a solar panel, and a transfer switch. The main AC source and the AC synchronous generator are connected to the transfer switch. The system also includes a DC/AC solar inverter, which is in communication with the solar panel. The transfer switch and the inverter are both connected to an AC common load panel where the AC power provided by the DC/AC solar inverter, the AC synchronous generator, and the main AC source is used to satisfy a common AC electrical load.

The system further includes a system control device that is in communication with the inverter and the transfer switch and is capable of selectively determining power input to the common load panel. This system can be built directly into a new building or it may be retrofit onto an existing structure and can also be used with system components that were not previously available for "off grid" application.

The objectives are further realized by providing an AC power coupling and AC power distribution method for efficient distribution of available AC power sources, the method including the steps of providing an AC power cogeneration system as described above, measuring AC electrical availability, type, capacity and AC load requirement with a system control device, measuring AC power condition and availability at multiple system points, and selecting the AC power source or combination of AC power sources to satisfy common AC load requirements. This method allows for flexible operation of an AC electrical cogeneration system depending on the availability of utility power, solar AC power availability, synchronous AC generator availability, and common AC load requirements, incorporating social and economic advantages as described.

BRIEF DESCRIPTION OF THE DRAWINGS

FIG. 3b is a flow chart presenting a continuation of the processes illustrated in FIG. 3a.

DETAILED DESCRIPTION OF THE PREFERRED EMBODIMENT AND OPERATION OF THE INVENTION

Figure 1:
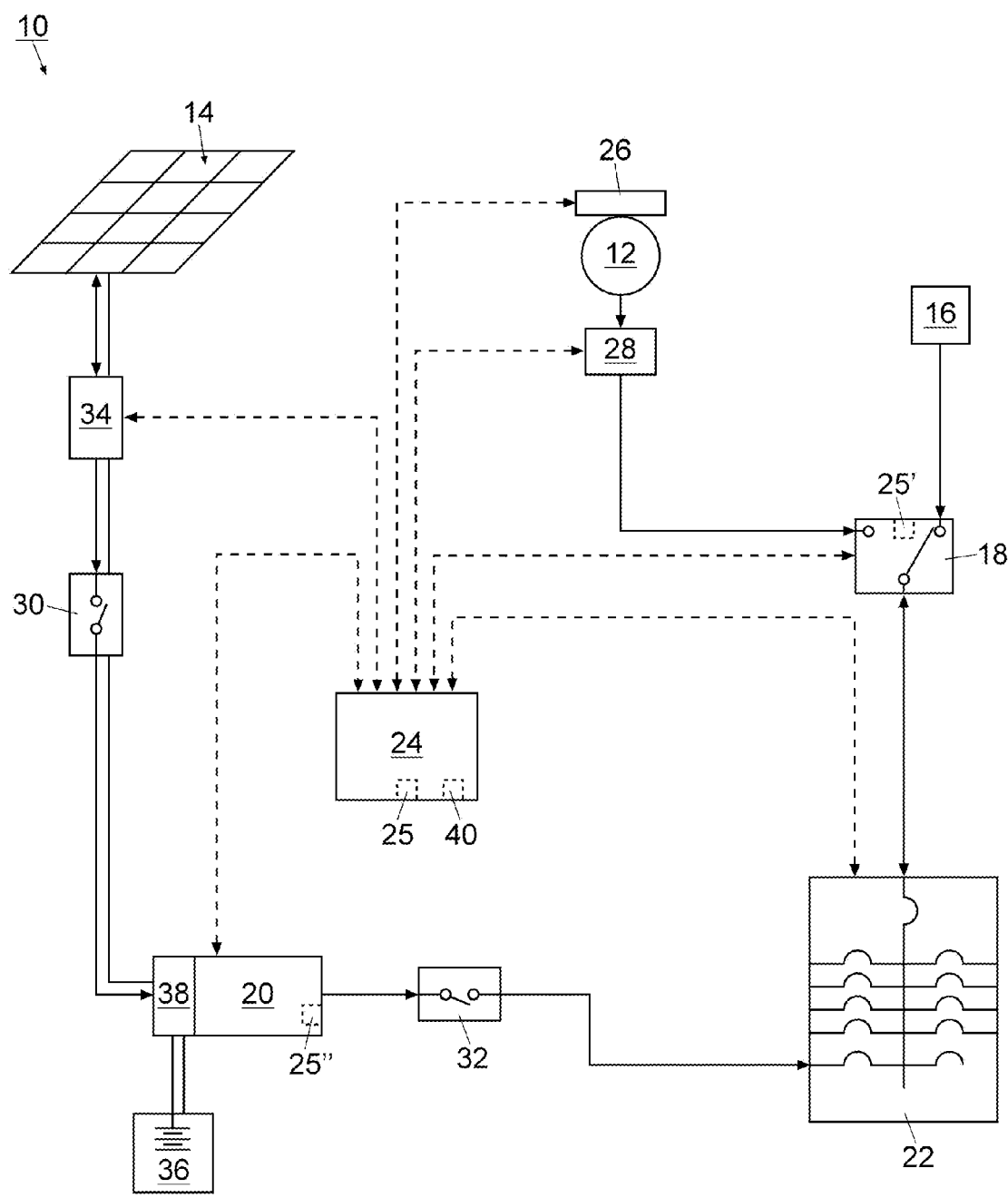
FIG. 1 is a schematic diagram of an AC power cogeneration and AC coupling system.

For a better understanding of the invention and its operation, turning now to drawings, FIG. 1 displays all AC power components of cogeneration system 10 as shown by single line with bidirectional arrows at each component connection. All DC power components are shown by a double line without arrows between each DC component connection. All signal, analog, digital, cellular, network, or radio communication connections are represented by single broken lines between components.

FIG. 1 displays AC electrical cogeneration and AC coupling system 10, which preferably includes solar panel 14, solar controller 34, DC/AC inverter 20, common AC load panel 22, automatic transfer switch 18, load controller 28, synchronous AC generator 12, and generator controller 26. Preferred cogeneration system 10 also includes DC disconnect switch 30 and AC disconnect switch 32 which are required by various solar installation codes. Utility grid 16 is also included in preferred system 10 as an operational baseline which provides a normal AC power conduit for load panel 22, and for receiving excess solar generated AC power from inverter 20 back through grid 16. Utility grid 16 AC power may be absent during system 10 operation and is not a requirement for AC coupling/cogeneration. Charge controller 38 and battery bank 36 are optional accessories in system 10 to accommodate the control requirements of some inverter 20 designs. However charge controller 38 and battery bank 36 are not required as a DC to AC power source for successful system 10 operation. Also included in preferred system is system control device 24 containing programmable logic 40.

Synchronous AC generator 12 shown in FIG. 1 is preferably an AC synchronous generator with a sine wave alternator commonly manufactured in single or 3 phase winding configuration, capable of producing voltage and frequencies common to U.S. and International Electrical Codes and devices. Generator 12 shall be frequency governed by system control device 24 and logic 40 to perfect utility match isochronous throughout load range 0 to 100%. Generator 12 size in terms of Kilowatts (KW) is unlimited, however conventional methodology is to match KW capacity to meet designated load of common load panel 22 when normal utility grid 16 AC power is absent. System 10 will preferably have generator 12 with a minimum of 1 KW.

As is known, an AC synchronous generator such as generator 12 produces electricity which has voltage, phase rotation and frequency that exactly match other system 10 AC power components such as utility grid 16 and solar inverter 20. During operation, this matching of voltage, phase rotation and frequency may be referred to as synchronous AC paralleling in that two or more components of system 10, for example AC synchronous generator 12 and solar panel 14, are servicing load panel 22 with identical voltage, phase rotation, and frequency of power without causing backfeed in the system which could potentially damage AC synchronous generator 12. Common methods of operating generator 12 include fossil fueled internal combustion engines of appropriate size for generator 12 KW output range. Other methods (prime mover) includes wind, hydro-electric, and external combustion. All prime mover applications employ prime mover electronic governor controls (not shown) that are prime mover speed (frequency) adjusting throughout the rated generator 12 KW ranges. All prime mover applications must be isochronous in frequency from 0 to 100% rated load of generator 12. Generator 12 is required to operate at a frequency and voltage range that matches the sensing and operational voltage of inverter 20 under all load conditions.

FIG. 1 shows solar panel 14 as source of renewable DC energy converted to AC power at same voltage and isochronous to system 10 through solar inverter 20. Other renewable sources such as wind, hydro-electric, and future energy sources may be equally employed as long as this energy source is converted through an inverter such as inverter 20 compatible to system 10.

Generator controller 26 and load controller 28 are also illustrated in FIG. 1. Generator controller 26 is responsible for starting and stopping the prime mover (for example, generator 12 equipped with a fossil fuel internal combustion engine), monitoring and adjusting parameters in generator 12, providing status indicators, alarms, and safety shutdown protection. Communication and control within generator controller 26 can be provided by hardware, software, firmware, analog or digital or any combination of these components as individual applications require. Preferably, system 10 uses common communication languages or MODBUS and CAN, however other languages and methods, may also be employed. Communication may be hard wired, wireless connected via a network (not shown) or any combination thereof. Loss or absence of AC power supplied by utility grid 16 signals microprocessor 25' and logic 40 concurrently in automatic transfer switch 18, generator controller 26, and system control device 24.

After a predetermined time out period to ensure that the AC power outage was not momentary, microprocessor 25' in automatic transfer switch 18, signals logic 40 in communication with generator controller 26 to start the prime mover rotating and accelerating to rated isochronous system 10 frequency. Voltage regulation sensors (not shown) and generator controller 26 produce voltage rated system 10. Generator controller 26 monitors important prime mover functions and operational parameters and important generator 12 electrical functions and operational parameters according to requirements set forth by IEEE, UL, NFPA, NEC, EGSA, and other AC power regulatory entities. All real time operational information from generator controller 26 and automatic transfer switch 18 is sent to control system device 24 via communication method employed, normally hardwire RS 485, known as MODBUS.

Once generator 12 is operating with the exact electrical characteristics of utility grid 16 in terms of voltage, phase rotation, frequency, and phase angle automatic transfer switch 18 initiates a physical electrical disconnect of utility grid 16 from system 10. Instantaneously, the switching mechanism in transfer switch 18 connects the generator 12 electrically to common load panel 22. This switching process in automatic transfer switch 18 may be mechanical or static as long as the AC power of utility grid 16 is physically isolated from all AC power components in system 10. At this point the various features of system 10 are completely active. For example, see FIG. 2 for a flow chart representing system 10 in its most deactivated state and FIGS. 3-3b for flow charts presenting system 10 in active stages.

Once AC power transfer at automatic transfer switch 18 has occurred, AC current moves from synchronous AC generator 12 through the now closed contacts in transfer switch 18 and through the common load panel 22 to power the attached loads (not shown). Solar inverter 20 is electrically connected to load panel 22 through the AC power wiring, indicated in FIG. 1 with a single solid line. Microprocessor 25" and PLC logics located inside inverter 20 sense the AC power supplied by the generator 12 as electrically identical as that supplied by utility grid 16 and inverter 20 turns on after an optional predetermined time delay. Solar inverter 20 is capable of converting DC electricity from solar panel 12. All solar inverter 20 operational control and data are transmitted to system control device 24 via a communication method such as MODBUS.

Simultaneously, AC current flows through accurately calibrated conventional current transformers and other electrical sensors (not shown) located in generator controller 26 and load controller 28. Current transformers and other current measure and control devices like them in generator controller 26 monitor generator 12 AC current in the outgoing (to load) direction for control and monitoring purposes. For example, one such control purpose is to protect generator 12 from overloaded current from excessive AC load in the common load panel 22. An example control response to this occurrence may be to signal a load to be shed or the main AC generator breaker (not shown) to trip, or to shut the generator 12 down entirely.

Figure 4:
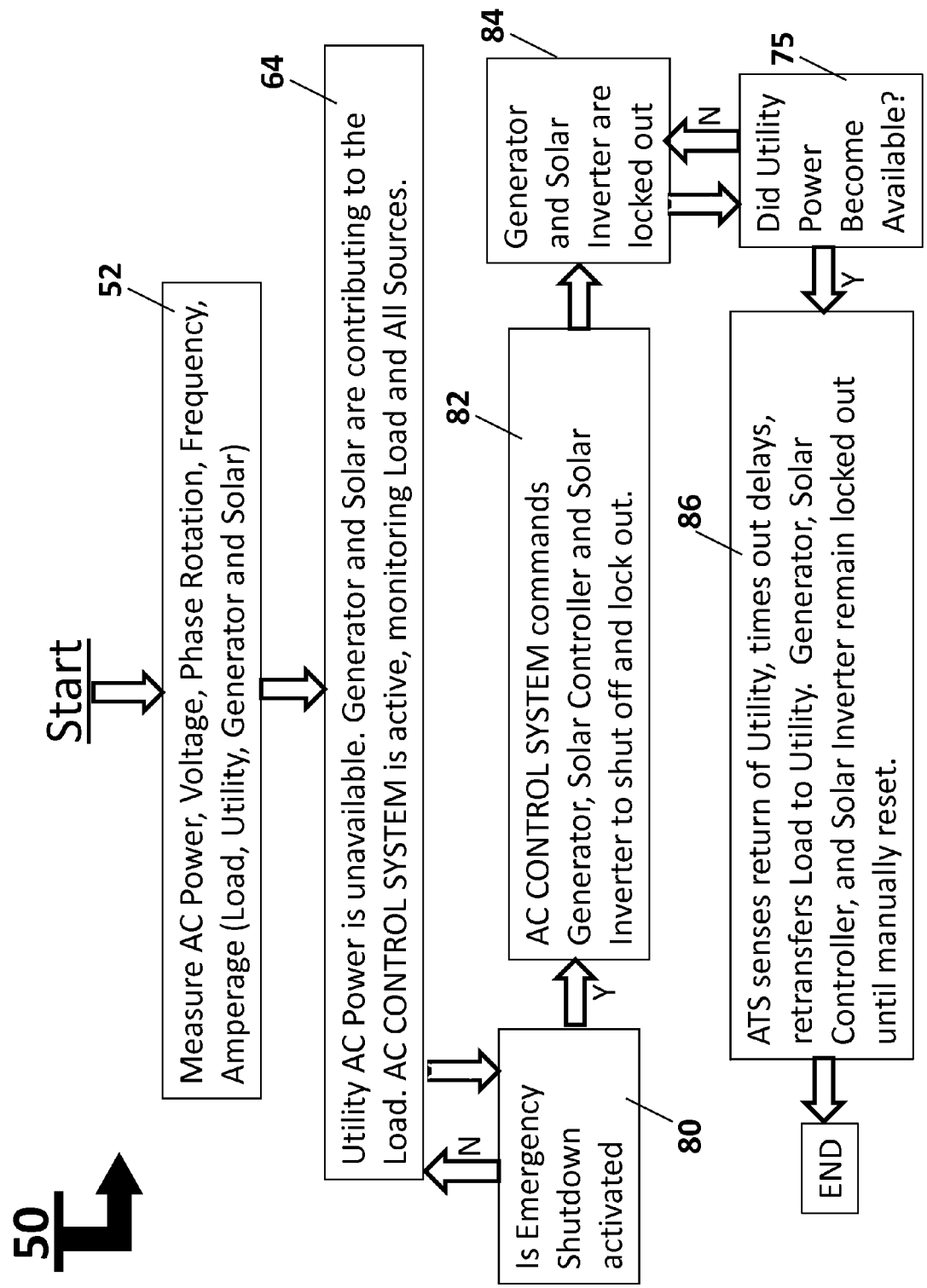
FIG. 4 is a flow chart illustrating the logic sequence of an emergency shutdown command issued by the system of FIG. 1.

The purpose of current transformers and other AC current measure and control devices in load controller 28 is to monitor and control AC current in the incoming direction (towards generator 12). Load controller 28 is a unique feature that protects generator 12 from AC reverse current damage. This reverse current can occur when solar inverter 20 is producing AC current in excess of the AC current requirements of common load panel 22 and this current must flow by Electrical Law back into the stator windings (not shown) of generator 12 creating damaging inductive currents that destroy sensitive electrical and electronic components. An example of this occurrence is represented in FIG. 4.

All information from generator controller 26 and load controller 28 is routed to system control device 24 via communication method. Microprocessor 25 and logic 40 within system control device 24 respond to this data with multiple control and data reporting functions (see FIGS. 2-3b). In the case of a reverse current signal from load controller 28, for example, system control device 24 responds by sending a signal to solar controller 34 to turn off solar module(s) (not shown) or entire solar panel 14 until the AC reverse current event ceases. The reduction or elimination of DC current in solar panel 14 reduces or eliminates the conversion of AC current from inverter 20 to load panel 22 which in turn terminates the reverse AC power event.

Synchronous AC generator 12 continues to power the common load panel 22 under normal operation when electricity from utility grid 16 is lost. When AC current sensed by load controller 28 rises above a programmed set point, a signal is sent to solar controller 34 by system control device 24 to turn solar controller 34 back on in stages or all at once depending on user input included with programmed logic 40 and system algorithms based on the requirements of a given site contained in system control device 24.

FIG. 1 further demonstrates DC solar panel 14, consisting of one or more conventional DC solar modules (not shown) the quantity of which is limited only by designed KW system size. These solar modules may be connected in electrical series or parallel configurations to form solar DC solar panel 14 as the preferred embodiment of a renewable energy collector serving as a renewable power supply. Tidal generators, bio-digesters, and other generators are all examples of alternative power sources that could serve the same purpose for electric cogeneration system 10. Although only one DC solar panel 14 is shown for discussion, it is understood that electric cogeneration system 10 may incorporate any number of solar panels 14 arranged to maximize capture of solar generated radiant energy. As is known in the art, solar panel 14 is composed of one or more photovoltaic modules, which are comprised of one or more photovoltaic cells, manufactured for example with structural substances such as silicon or cadmium telluride and conducting wires composed of copper or silver. Although solar panel 14 is illustrated in a fixed position in FIG. 1, mounting methods are known in the art which allow panel 14 to pivot and track the sun, furthering increasing the efficiency of solar panel 14. In one or more alternate embodiments, solar panel 14 may be modified to mount on structural roofs, adequate ground surfaces, poles and vertical structures, marine vessels, vehicles, trailers in a permanent or portable configuration as individual system applications require. Solar panel 14 may further include commercially available solar modulators (not shown) to boost the collection efficiency and electrical output from panel 14.

Cogeneration system 10 in its preferred embodiment requires solar panel 14 to be connected to and controlled by solar controller 34. Solar controller 34 may be connected to each solar module, to each module string, or directly control the entire solar panel 14 or any combination or in any connection method not describe here. Solar controller 34 acts as an on/off switch to allow solar generated DC current to flow or cease flowing to the DC/AC solar inverter 20 on an individual module level, module string level, or the entire collective solar system panel 14.

Solar 34 is in communication with AC system control device 24 via communication method including but not limited in any way to RS 485 MODBUS hard wire, wireless communication via cellular, radio wave or other method not described here. Other embodiments may be incorporated into the solar controller 34 design including DC to DC shade optimizers, remote monitoring and programming software, hardware and firmware, and other features or improvements known in the art.

Solar panel 14 and solar controller 34 are connected to solar inverter 20 through DC solar disconnect 30 and solar AC disconnect 32 as required by the National Electric Code (NEC) section 690 and other codes as required by AHJ. Solar DC disconnect 30 is a commercially available switch that manually or mechanically disconnects or connects the solar DC current supply to the DC side of solar inverter 20. DC solar disconnect 30 is a site required safety and maintenance device to isolate solar derived energy from causing physical injury to equipment and personnel during maintenance, repair and site emergency situations.

DC/AC solar inverter 20 is shown connected to DC solar disconnect 30 and Solar AC disconnect 32, both manual and mechanical means of isolating the DC/AC solar inverted 20 from respective DC and AC voltages for the purpose life and equipment safety, maintenance and repair of subject inverter as required by NEC section 690 and other codes. Optionally these disconnects may be remote operated through wire and wireless communication means operating through AC system control device 24 in FIG. 1. Preferably, DC/AC solar inverter 20 is a synchronous, purely sine wave AC, grid connected and activated. These solar inverter types are known in the art and commercially available at retail locations. Additional features that may be included in other embodiments of DC/AC solar inverter 20 include additional capacitors, inductors, and filters (not shown) which can be used to modify wavelength and amplitude of the electrical signal wave, or pulse-width modulation which is a known procedure to modify the AC output current of DC/AC solar inverter 20. Solar inverter 20 may also incorporate remote control and communications software, firmware, and hardware specifically designed for AC system 10 operation as individual applications require.

AC cogeneration and coupling system 10 further supports DC/AC solar inverter 20 designs that include DC mass energy storage, for example battery bank 36, in their respective operation. These solar inverters as known in the industry as "stand alone" or "off grid" are designed to function in the absence of any commercial AC power supply from utility grid 16. As previously stated, system 10 does not require any DC mass storage to AC couple at any time, except when individual commercial solar inverters require it to function. Some advantages incorporated into this specific design may be uninterrupted power supply (UPS) capabilities to provide continuous and seamless AC power during any AC power supply transition during system 10 operation.

In DC/AC solar inverter designs that require DC energy mass storage for operational functionality, solar inverter 20 typically incorporates DC charge controller 38 and an AC/DC battery charger (not shown) to maintain the proper DC voltage and current capacity (Amp-hours) for system operation and DC battery bank 36 longevity.

Both solar inverter 20 by way of solar inverter AC disconnect 30 and automatic transfer switch 18 are connected to common AC load panel 22 which is preferably a conventional circuit breaker box or panel with a main AC circuit breaker and a plurality of circuit breakers (not shown) as known in the art. The size and features of common AC load panel 22 will be unique to the site where it is located, but preferably panel 22 will have a combination of different AC current circuit breakers (not shown) designed to trip in the event a fault condition is detected. In a residential installation, panel 22 may have more low current AC breakers while at commercial and industrial sites panel 22 may be composed of more medium and high current AC breakers.

Automatic transfer switch 18 is also connected to common AC load panel 22, and in the preferred embodiment of electric cogeneration system 10, automatic transfer switch 18 is a "break before make, toggle of linked lockout contactor automatic transfer switch. An automatic transfer switch such as switch 18 is in continuous communication with AC system control device 24 and synchronous AC generator controller 26 and has the capability to communicate the start and operate AC synchronous generator 12 and transfer electrical AC load of common AC load panel 22 to AC synchronous generator 12 once it is meets AC requirements in the event loss in voltage is detected. This type of switch is commercially available at retail locations.

Electric cogeneration system 10 is controlled by system control device 24, which in the preferred embodiment of cogeneration system 10 is a conventional state of the art programmable logic control, which receives and processes electrical and system data from key system devices such as DC solar controller 34, DC/AC solar inverter 20, common AC load panel 22, automatic transfer switch 18, synchronous AC generator load controller 28, and synchronous AC generator controller 12. Other monitoring and data collecting points may be added per site specific application as desired. System control device 24 controls the access and current flow of all AC power sources to achieve AC coupling, AC power control and direction, and design features utilizing hardware, software, firmware, languages, and digital and analog communications available in the industry and to be developed for application. System control device 24 is configured for local and remote programming throughout the range of system sizes (KW) and application site diversity. System control device 24 houses system logic 40 which in turn governs communication hardware, software, and firmware, associated communication languages, and equipment, to ensure that system 10 complies with current industry standards for safety and efficiency.

System logic 40 conveys visual, analog, and digital information concerning the condition and operation of individual system components as well as complete system 10 status and operations in a local as well as remote capacity. System logic 40 interfaces with devices such as computers, fixed and portable, internet devices, modems, hard wired circuits, cellular, and satellite communications devices and methodologies, visual display screens, auditory alarms and other methods not stated here. Some remote programming and system 10 control functions are incorporated into system 40 output and function.

Figure 2:
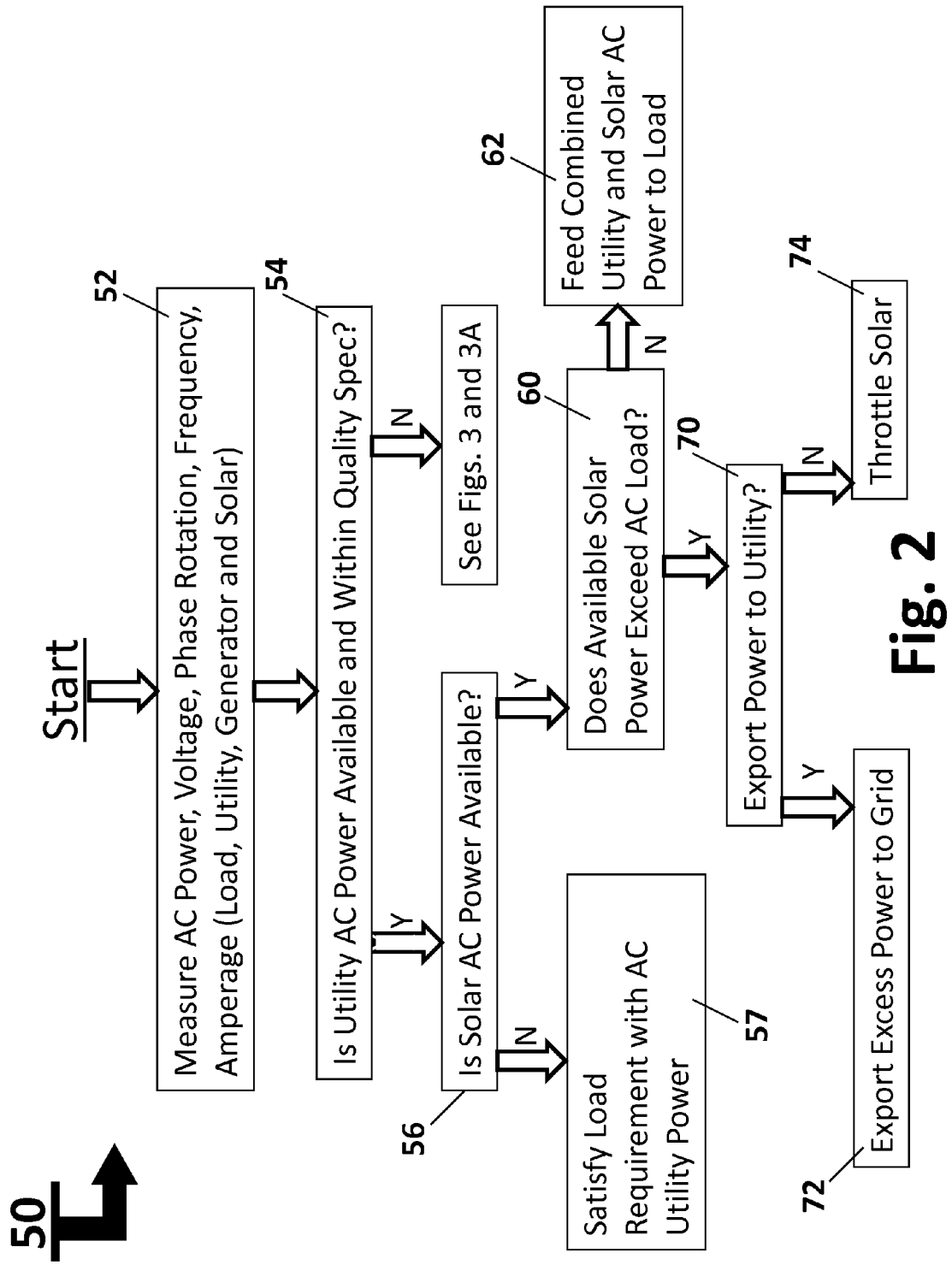
FIG. 2 is a flow chart showing the AC coupling and cogeneration system illustrated in FIG. 1 in the presence of, and connected to AC utility power.
Figure 3:
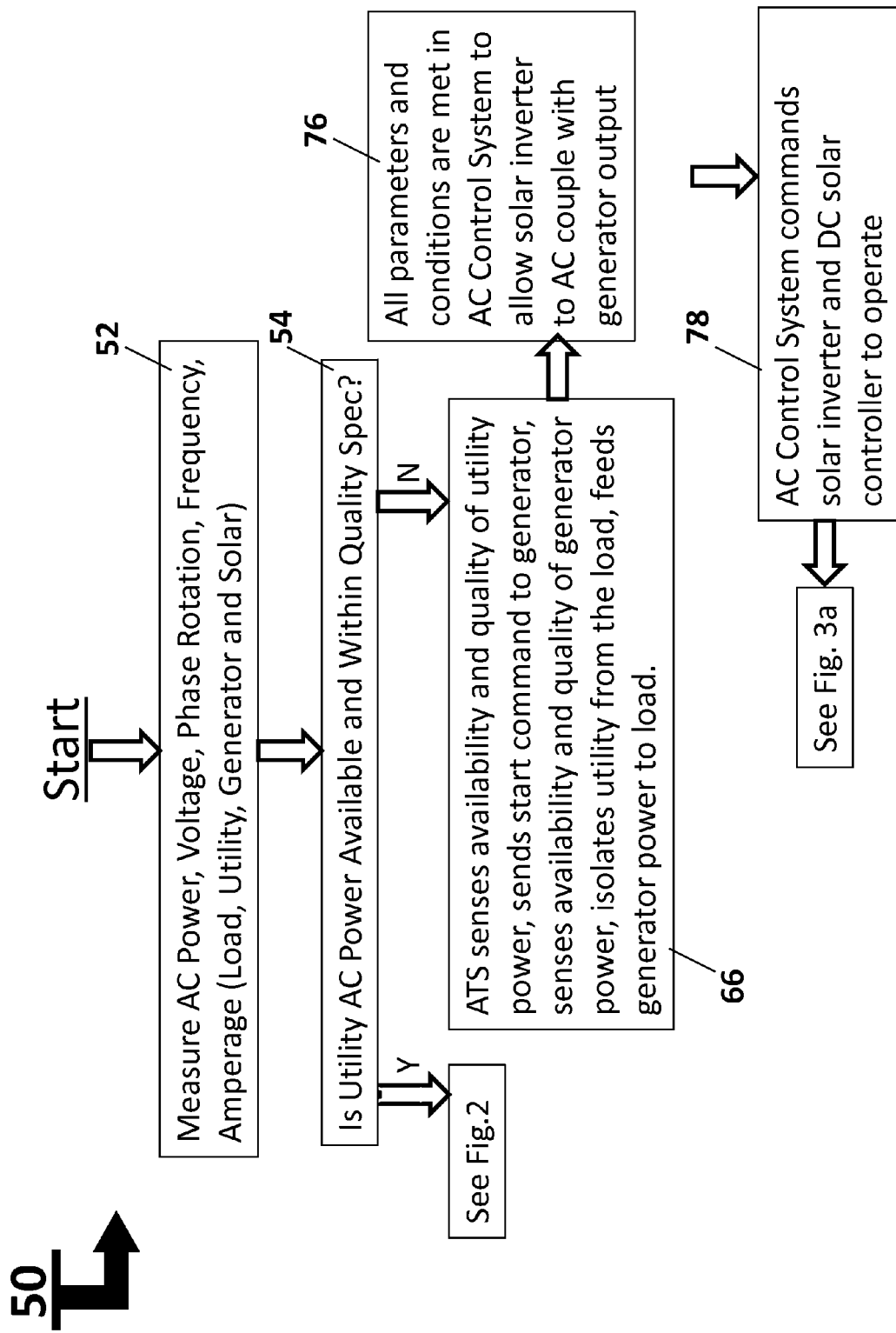
FIG. 3 is a flow chart showing the operation of the AC power coupling and cogeneration system of FIG. 1 in the absence of AC utility power.

FIGS. 2-4 present flow charts illustrating the operation of AC utility grid 16, AC automatic transfer switch 18, synchronous AC generator 12, generator controller 26, DC/AC solar inverter 20, DC solar panel 14, solar controller 34, common AC load panel 22, AC system control device 24, and system logic 40 in various operating environments of AC cogeneration and AC coupling system 10.

A method of operating AC electrical cogeneration and AC coupling system 10 illustrated in FIG. 1 is shown in FIG. 2 in the presence of electricity from AC utility grid 16. Preferred method 50 includes step 52 measuring AC power, voltage, phase rotation, frequency, and amperage for load utility, generator and solar. Preferred method 50 also includes step 54 communicating with automatic transfer switch 18 to determine utility grid 16 AC power is consistent with predetermined specifications calculated by system control device 24. Preferred method 50 further includes step 56 system control device 24 querying DC/AC solar inverter 20 to determine if AC solar power is available, and if so, ascertaining the availability, amount, and characteristics of the available solar power as generated by DC solar panel 14, monitored and transmitted through closed circuit electronic switches of DC solar controller 34, passed the closed switching contacts of DC solar disconnect 30, inverted to AC current by DC/AC solar inverter 20 and supplied to common AC panel 22 through closed switchable contacts in the solar inverter AC disconnect 32.

In the event step 56 determines that AC solar power is not available, step 57 satisfies the load requirement with electricity from utility grid 16 through the closed electro-mechanical contacts within automatic transfer switch 18. However, in the event step 56 determines that AC solar power is available from DC/AC solar inverter 20, preferred method 50 additionally includes step 60 system control device 24 evaluating if the available AC current exceeds the present load requirement. If AC solar current is determined to exceed the current requirements in step 60, step 70 system control device 24 directs the excess solar AC current from solar inverter 20 through the closed breakers (not shown) of common load panel 22, through the closed, switchable electro-mechanical contacts in automatic transfer switch 18 back to AC utility grid 16. Method 50 may also include step 72 sending the surplus electricity through a power metering device (not shown) to become absorbed by the AC utility transmission system of utility grid 16.

If system control device 24 determines in step 70 not to export excess AC solar current, for example due to some unexpected system condition, preferred method 50 further includes step 74 "throttling" (i.e. increasing or decreasing to match system conditions as dictated by system control device 24) AC solar current to an AC current level that meets system conditions and parameters. Specifically, this AC solar "throttling" is achieved through commands issued to various control mechanisms, for example DC/AC solar inverter 20, DC solar controller 34 or both. If system control device 24 determines there is not sufficient AC solar current in excess of common load panel 22 requirement, step 62 all available AC solar current from solar inverter 20 is supplemented with AC current from the utility grid 16 through the devices and controls previously described.

FIG. 3 depicts the operation of cogeneration and AC coupling system 10 in the absence of utility grid 16 electricity. Automatic transfer switch 18 senses the loss AC utility power from utility grid 16 step 54 and commands the synchronous AC generator to start (the preferred example of a fossil fueled internal combustion prime mover) and accelerate to a constant rotational speed that matches the required AC system frequency (also known as an isochronous frequency). Required AC voltage is produced in the proper phase sequence and sine wave characteristic of generator 12. Automatic transfer switch 18 receives acceptable parameters from system control device 24 and opens the switchable electro-mechanical contacts located within automatic transfer switch 18 disrupting the AC power connection between utility grid 16 and common load panel 22 and closes the AC power contact between synchronous generator 12 and common load panel 22. Utility grid 16 is electrically isolated from the solar inverter 20 in the absence of utility AC power as required by UL 1741 and other codes. Synchronous AC generator 12 step 66 provides all the AC power required by the common load panel 22.

Solar inverter 20 receives the AC voltage and frequency from synchronous AC generator 12 through a closed breaker in common load panel 22 which causes solar inverter 20 to furnish DC power supplied from DC Solar panel 14 as previously described in FIG. 2. Inverter 20 is capable of providing AC solar power commensurate with the degree of DC solar energy available. Preferred method 50 further includes step 76 system control device 24 receiving system data that all electricity parameters and conditions are met and allowing solar inverter 20 to AC couple with generator 12 AC output. Preferred method 50 also includes step 78 system control device 24 commanding solar inverter 20 and solar controller 34 to operate and provide AC solar power to common load panel 22.

Figure 3A:
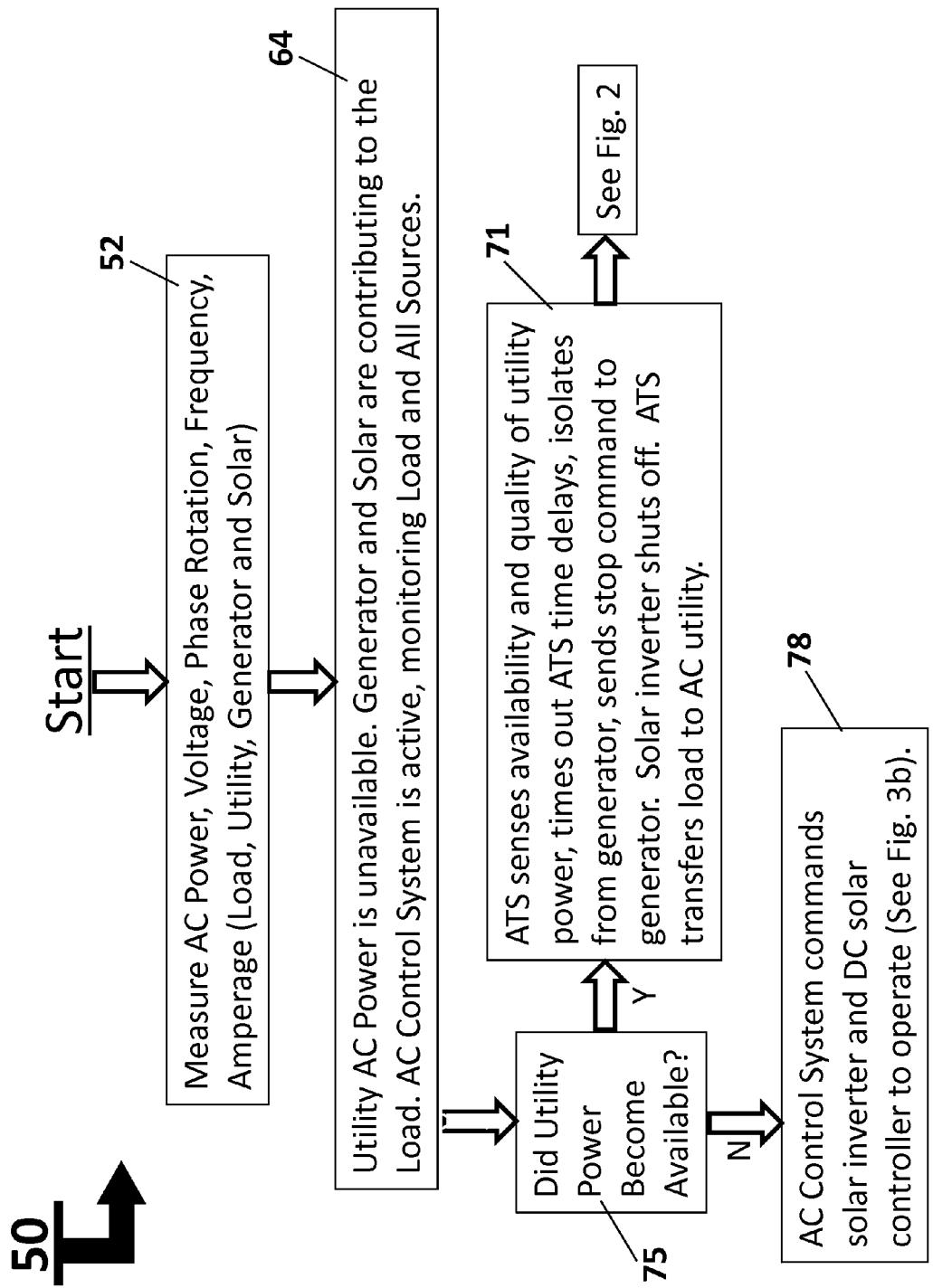
FIG. 3a is a flow chart showing a continuation of the operational logic of the cogeneration and AC coupling system displayed in FIG. 1.

Preferred method 50 of operating AC cogeneration and AC coupling system 10 continues in FIG. 3a. Method 50 further includes step 64 generator 12 and solar panel 14 servicing the load while system control device 24 is monitoring electricity load requirements and all contributing AC sources while power is unavailable from utility grid 16 (see step 66 in FIG. 3). During step 64, system control device 24 is actively controlling system 10, furnishing AC solar power via solar inverter 20 and AC generator power from generator 12 in an AC coupled manner to common load panel 22. Preferred method 50 still further includes step 75 system control device 24 continuously monitoring the availability of utility grid 16. If utility grid 16 becomes available, method 50 also includes step 71 automatic transfer switch 18 sensing the availability and quality of power from utility grid 16 and timing out programmed transfer delays. Automatic transfer switch 18 also transfers the load of common load panel 22 back to utility grid 16 and electro-mechanically locks out synchronous AC generator 12 from common load panel 22. Further, a stop generator command is sent to generator controller 26 and solar inverter 20 is deactivated, stopping the AC solar current. After these functions are performed, system 10 returns to the state depicted in FIG. 2. In the alternative, if utility grid 16 remains unavailable, method 50 includes step 78 system control device 24 commanding solar inverter 20 and solar controller 34 to continue operating (see FIG. 3b).

Figure 3B:
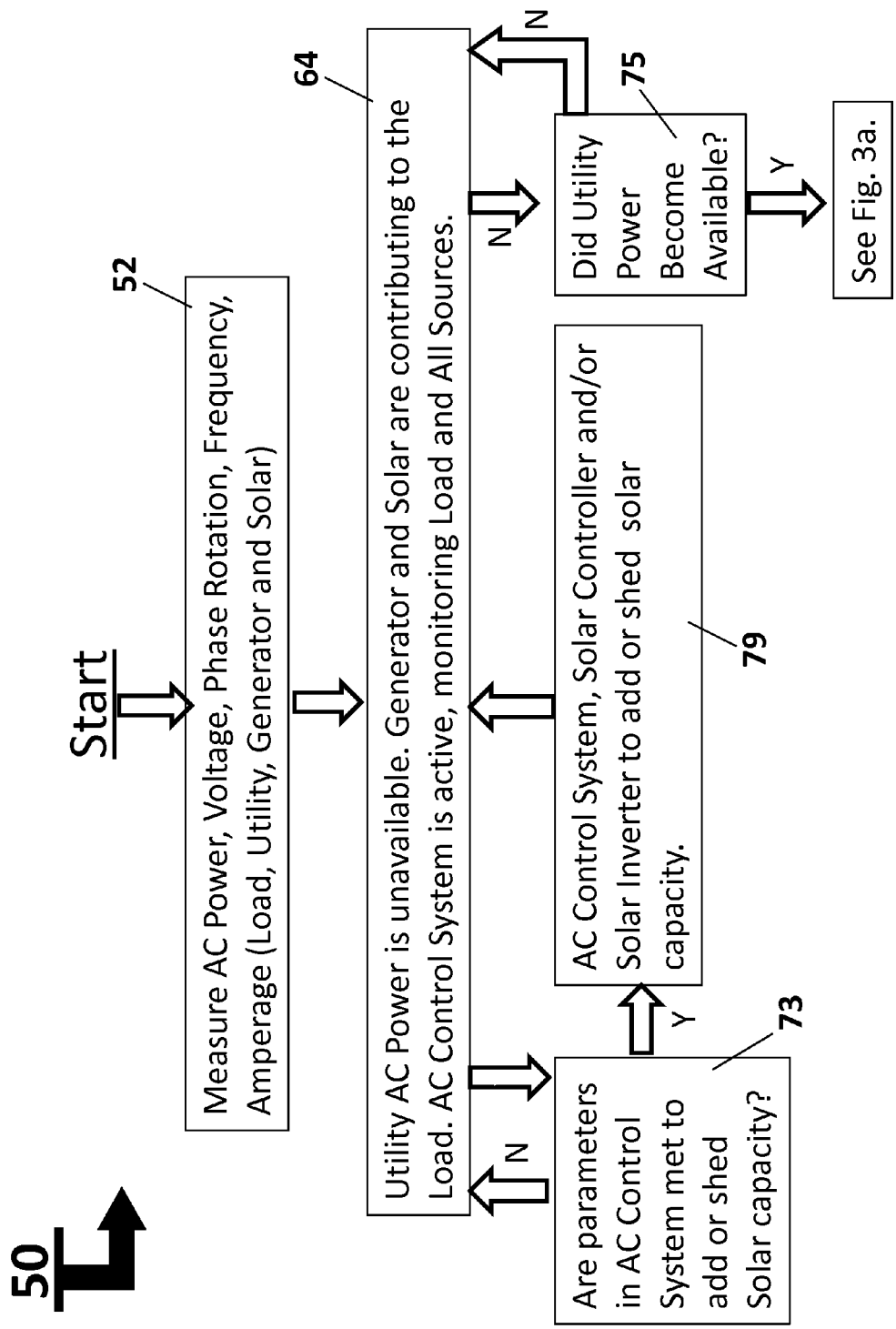

FIG. 3b is a flow chart showing a continuation of operational logic 40 of cogeneration and AC coupling system 10 displayed in FIG. 1. Method 50 repeats steps, 52 and 64 as previously described, further including step 73, system control device 24 determining if system parameters based on the location housing system 10 are met to add or shed AC solar current capacity.

If system parameters are not met, method 50 mandates a return loop to step 64. However, if system parameters are satisfied, method 50 preferably further includes step 79 system control device 24 controlling solar controller 34 and/or solar inverter 20 to add or shed AC solar current by restricting the flow of current to common load panel 22. Preferred method 50 still further includes step 75 system control device 24 monitoring for availability of AC utility grid 16. If utility grid 16 becomes available method 50 returns to step 71 (FIG. 3a), but if AC power from utility grid 16 is not available, method 50 returns to step 64.

FIG. 4 is a flow chart showing the logic sequence of an emergency shutdown command issued by system 10. Method 50 repeats steps 52 and 64 as previously described, and preferably includes step 80 system control device 24 deciding whether an emergency shutdown is required. An emergency shutdown may be a manual or automatic control function resulting from a system or site catastrophic event that could cause human, hardware, software, or firmware damage if system 10 is left active. Examples would include fire in the vicinity of the solar panel 14, or loss of major sensor inputs for system control device 24, or failure of system control device 24 itself. If step 80 is not required, method 50 returns to step 64. If step 80 is necessary, integrated failsafe circuits in system control device 24 command synchronous generator 12, solar controller 34, solar panel 14, and solar inverter 20 to shut down, disperse all power and lock out these power sources, until step 82 requiring a manual reset of system 10. Method 50 further includes step 84 continuing to lock out generator 12 and solar panel 12 and step 75 automatic transfer switch 18 sensing available AC power from utility grid 16 AC. If utility grid 16 is available, method 50 includes step 86 transfer switch 18 transferring common load panel 22 back to utility grid 16 AC power; however system 10 components in step 82 remain locked out until manual system reset.

We claim:

1. A method of synchronously paralleling multiple AC power sources, the method comprising the steps of:
    a) providing a paralleling system comprising a main AC power source, a synchronous AC generator, a solar panel, a solar controller, said solar panel linked to said solar controller, a DC disconnect, said solar controller connected to said DC disconnect, an AC disconnect, a transfer switch, a generator controller, a load controller, said generator and load controllers connected to said synchronous AC generator, said main AC power source and said load controller connected to said transfer switch, an inverter, said inverter in communication with said AC disconnect, a load panel, said transfer switch and said inverter connected to said load panel, a system control device, said system control device in communication with said inverter, said transfer switch, said solar controller, said generator controller, and said load controller;
    b) measuring an electrical load by said system control device at said load panel;
    c) selecting an AC power source to satisfy the electrical load;
    d) configuring the system control device to match AC power produced by the synchronous AC generator and the renewable power source to power produced by the main AC power source;
    e) detecting a reverse power flow event at the AC synchronous generator; and
    f) throttling power produced by the renewable power source to decrease available AC power until the reverse power flow event ceases.

2. The method of claim 1 further comprising the step of determining, via the system control device, the availability of electricity from the main AC power source.

3. The method of claim 2 wherein the step of managing AC power output further comprises returning electricity in excess of the electrical load provided by the solar panel to the main AC power source.

4. The method of claim 3 further including the step of changing the source of AC power from the main AC power source to the synchronous AC generator via the automatic transfer switch.

5. The method of claim 4 wherein the step of changing the source of AC power further comprises the step of starting the synchronous AC generator.

6. The method of claim 2 wherein the system control device delays a predetermined time to determine the availability of electricity from the main AC power source.

7. The method of claim 1 further comprising the step of reducing the amount of electricity produced by the synchronous AC generator by the amount of electricity provided by the solar panel.

8. The method of claim 7 further comprising the step of switching the AC power source to the main AC power source via the transfer switch should the electrical load requirement not be met and the main AC power source be available.

9. An electrical cogeneration system for synchronously AC paralleling multiple AC power sources, said system comprising a synchronous AC generator, a renewable power source, a system control device, said system control device in communication with said synchronous AC generator and said renewable power source, said system control device configured to match AC power produced by said synchronous AC generator and said renewable power source, whereby said system control device detects the presence of a reverse power flow event proximate said synchronous AC generator and throttles power produced by said renewable power source to decrease available AC power until said reverse power flow event ceases.

10. The system of claim 9 further comprising an automatic transfer switch connected to a main AC power source, an inverter, and a load panel, said system control device in communication with said transfer switch, said inverter, and said load panel, said main AC power source and said synchronous AC generator connected to said transfer switch, said renewable power source connected to said inverter, said transfer switch and said inverter connected to said load panel, said system control device in communication with said transfer switch and said inverter.

11. The system of claim 9 further comprising a generator controller, a load controller, said generator controller attached to said synchronous AC generator and in communication with said system control device, said load controller connected to said synchronous AC generator, said load controller in communication with said system control device and said transfer switch.

12. The system of claim 11 further comprising a DC disconnect, an AC disconnect, said DC disconnect connected to said solar panel and said inverter, said AC disconnect connected to said inverter and said load panel.

13. The system of claim 12 further comprising a solar controller, said solar controller connected to said solar panel and said DC disconnect, said solar controller in communication with said system control device.

14. The system of claim 13 further comprising a battery, a charge controller, said charge controller connected to said battery and in communication with said inverter.

15. The system of claim 9 wherein said system control device includes programmable logic.

16. The system of claim 15 wherein said programmable logic is configured to reduce synchronous AC generator power output should said output exceed demand.

17. The system of claim 15 wherein said programmable logic is configured to reduce renewable power source power output should said output exceed demand.

18. The system of claim 15 wherein said programmable logic is configured to export power produced by said renewable power source should output of said renewable power source power exceed demand.

19. A method for synchronously AC paralleling multiple AC power sources, the method comprising the steps of:
   a) providing a paralleling system comprising a main AC power source, a synchronous AC generator, and a renewable power source in communication via a system control device;
   b) configuring the system control device to match AC power produced by the synchronous AC generator and the renewable power source to the main AC power source;
   c) detecting a reverse power flow event at the AC synchronous generator; and
   d) throttling power produced by the renewable power source to decrease available AC power until the reverse power flow event ceases.

20. The method of claim 19 further comprising the step of determining the availability or absence of power from the main AC power source via the system control device.

* * * * *